(12) United States Patent
Klimov et al.

(10) Patent No.: US 12,093,218 B2
(45) Date of Patent: Sep. 17, 2024

(54) PRE-PROCESSING OF FILES FOR NORMALIZATION OF FIXED LENGTH FRAGMENT COMPARISON

(71) Applicant: Acronis International GmbH, Schaffhausen (CH)

(72) Inventors: Ivan Klimov, Schaffhausen (CH); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 17/936,408

(22) Filed: Sep. 29, 2022

(65) Prior Publication Data

US 2024/0111723 A1 Apr. 4, 2024

(51) Int. Cl.
*G06F 16/00* (2019.01)
*G06F 16/16* (2019.01)

(52) U.S. Cl.
CPC ................ *G06F 16/164* (2019.01)

(58) Field of Classification Search
None
See application file for complete search history.

(56) References Cited

U.S. PATENT DOCUMENTS

| | | | | |
|---|---|---|---|---|
| 8,312,023 B2* | 11/2012 | Shields | ............... | G06F 16/903 713/180 |
| 8,438,174 B2* | 5/2013 | Shields | ............... | H04L 63/12 707/755 |
| 9,321,426 B1* | 4/2016 | Krupp | ............... | C06D 5/00 |
| 10,481,998 B2* | 11/2019 | Mola | ............... | G06F 21/6245 |
| 10,650,158 B2* | 5/2020 | Capone | ............... | G06F 16/13 |
| 11,706,183 B2* | 7/2023 | Singhania | ............... | G06Q 50/01 709/206 |
| 2007/0220260 A1* | 9/2007 | King | ............... | G06F 21/64 713/176 |

FOREIGN PATENT DOCUMENTS

| | | |
|---|---|---|
| CN | 107480549 B | 8/2019 |
| CN | 111353301 A | 6/2020 |
| CN | 113065330 A | 7/2021 |
| CN | 113228019 A | 8/2021 |
| CN | 114548107 A | 5/2022 |

* cited by examiner

*Primary Examiner* — Debbie M Le
(74) *Attorney, Agent, or Firm* — ESPE Legal Consultancy FZ-LLC

(57) ABSTRACT

The present disclosure relates to pre-processing of files to better prepare them for the process of comparing fingerprints of fragments of fixed size N from these files to other files that contain similar information but may be structured differently. The pre-processing method and system are applied to files with known protected data before fingerprints of some of the N-fragments from these files are added to the digital fingerprint library and to the unknown files before the fingerprints of some of their N-fragments are compared to the fingerprints of other N-fragments of data stored in the digital fingerprint library.

6 Claims, 5 Drawing Sheets

PRE-PROCESSING OF FILES FOR NORMALIZATION OF FIXED LENGTH FRAGMENT COMPARISON

FIELD OF THE INVENTION

The present disclosure generally relates to data security. In particular, the present disclosure relates to a system and method for pre-processing a file containing protected information prior to generating fingerprints of the files to be stored in a digital fingerprint library to standardize data representation to enable literal comparison through comparing fingerprints of fragments of fixed size N.

BACKGROUND OF THE INVENTION

With the advent of digital technology and cyber security threats, data security has become a critical issue in all aspects of computer technology. Many enterprises, corporates, unions, organizations, and other such establishments contain valuable information which is vulnerable to data theft. For example, a company may be guarding its intellectual property, which is extremely sensitive and may position the company at risk if leaked or stolen, and therefore, must be protected.

Document fingerprinting is one well-known and widely used technique to prevent data leakage. Document fingerprinting is a technique of calculating, storing, and using a "fingerprint" to identify the document. A hash function is an example of a document's fingerprint. When a user attempts to share a document, the fingerprint of that document may be compared against the digital dataset of fingerprints of known documents that contain controlled or protected information. If the document's fingerprint is found in the database, the system may not allow the user to share the document.

Document fingerprinting technique cannot reliably identify protected information if it has been copied from a known file and pasted into a different file. Improved systems and methods are needed to address such cases.

SUMMARY OF THE INVENTION

The present disclosure relates to a system and method for pre-processing a file containing protected information before generating fingerprints of fragments of size N, N-fragments, of the file to store in a digital fingerprint library DFL. Also, it relates to a similar pre-processing of a file that needs to be inspected by comparing fingerprints of N-fragments against DFL.

Parameters of classification are determined for pre-processing, e.g., the type and based on the parameters, the pre-processing is performed. For example, textual documents, databases, audio files, video files, and binary executable files may all be processed according to their type.

The goal is to convert both known files and the inspected file to a format with probability that, if two files contain common strings of data of size greater than N, at least some N-fragments in this common format will match in both files after pre-processing by removing differences that may conceal the fact that two strings of data may have a common source. The term "format" in this case is used in the wide term and includes the language, file format, type of data (e.g., converting audio data to text by automatic transcribing), text formatting, compilation/decompilation of source code and binary executable code.

In an embodiment, a method of pre-processing of a file to be stored in the digital fingerprint library is described. The method includes steps of obtaining a file for pre-processing; identifying parameters for classification associated with the file, wherein the parameters include a file format and a language of the text inside the file; and pre-processing the file based on the determination of parameters.

In an embodiment, the same, symmetric, pre-processing steps are taken before fingerprints of N-fragments of the known file that contains protected data are added to the DFL, and before the file is inspected by comparing fingerprints of N-fragments extracted from it to DFL.

In an embodiment, pre-processing steps are taken only before fingerprints of N-fragments of the known file that contain protected data are added to the DFL.

In an embodiment, pre-processing steps are taken only before the file is inspected by comparing fingerprints of N-fragments extracted from it to DFL.

In an embodiment, the symmetric processing step includes at least one of extracting text from a file containing text; converting the text to a pre-defined codepage; implementing Unicode normalization forms; replacing symbols with modifiers to Latin symbols without modifiers; decomposing diacritics and digraphs, and removing combining marks from the text; removing double spaces from the text; removing spaces from text; removing punctuation marks from the text; removing certain characters from the text; removing words, indicating "noise" expressions, from the text; removing footers, headers, and standard fragments including salutations and signatures from the text; replacing non-Latin characters according to predefined rules; and decompiling binary files to obtain source code in text format.

In an embodiment, the steps of additional pre-processing of a file known to the digital fingerprint library includes at least one of translating the text of the file to a predefined language using an automatic translation tool; translating the text of the file to the pre-defined language using a manual translation method; and implementing an automatic text enhancement tool to enhance the text of the file for spell check, thesaurus, grammar check, sentence correction, and language optimization.

In an embodiment, the steps of additional pre-processing of a file having fragment fingerprints not compared to the digital fingerprint library includes at least one of translating the text of the file to a pre-defined language using an automatic translation tool; translating the text of the file to the pre-defined language using a manual translation method; identifying language of the text, using Artificial Intelligence, for translating the text from the determined language to the pre-defined language using an automatic translation tool; de-compiling a source code of the file, using a decompiler corresponding to the compiler used to compile the file; and re-compiling the file with the compiler specific to the digital fingerprint library.

In an embodiment, a system is implemented to pre-process a file known to contain protected data before fingerprints of certain N-fragments of that file are stored in a digital fingerprint library DFL. The system includes a file receiver and a pre-processor. The file receiver is configured to obtain a file for pre-processing and determine parameters for classification associated with the file, wherein the parameters include a file format and a language of the text inside the file. The pre-processor is configured to perform pre-processing the file based on the determination of parameters. The pre-processor is configured to perform symmetric pre-processing of a file when the file is of the type of one or more files stored in a digital fingerprint library, perform additional pre-processing of a file known to the digital fingerprint library for containing protected information, and perform additional pre-processing of a file having fragment fingerprints not compared to the digital fingerprint library.

The foregoing general description of the illustrative embodiments and the following detailed description thereof are merely exemplary aspects of the teachings of this disclosure and are not restrictive.

DETAILED DESCRIPTION

A digital fingerprint library comprises a database or other data storage including memory where fingerprints of fragments of fixed size N generated from the files known to contain protected data are stored. This digital collection may be referred to alternatively as a fingerprint library or a fingerprint database.

Protected information comprise information including trade secrets, patented data, confidential and proprietary business information of the Company, and any other information of the Company, including, but not limited to, customer lists (including potential customers), sources of supply, processes, plans, materials, pricing information, internal memoranda, marketing plans, internal policies, and products and services which may be developed from time to time by the Company and its agents or employees. Protected data is a kind of protected information.

The present disclosure mainly relates to a system and method for pre-processing a file containing protected information to prepare it for extraction of its fragments of fixed size N for further comparison to fragments of the same size from other files by using fingerprints of these fragments. After pre-processing, fingerprints of certain N-fragments of the file are generated and either are the digital fingerprint library or used to compare against information about other fingerprints of other N-fragments from other files that are stored in that digital fingerprint library.

The pre-processing is performed on the file to ensure uniformity in formatting, text language, and other parameters to achieve accurate fingerprint comparison between the N-fragments of files that contain information of similar nature.

Figure 1:
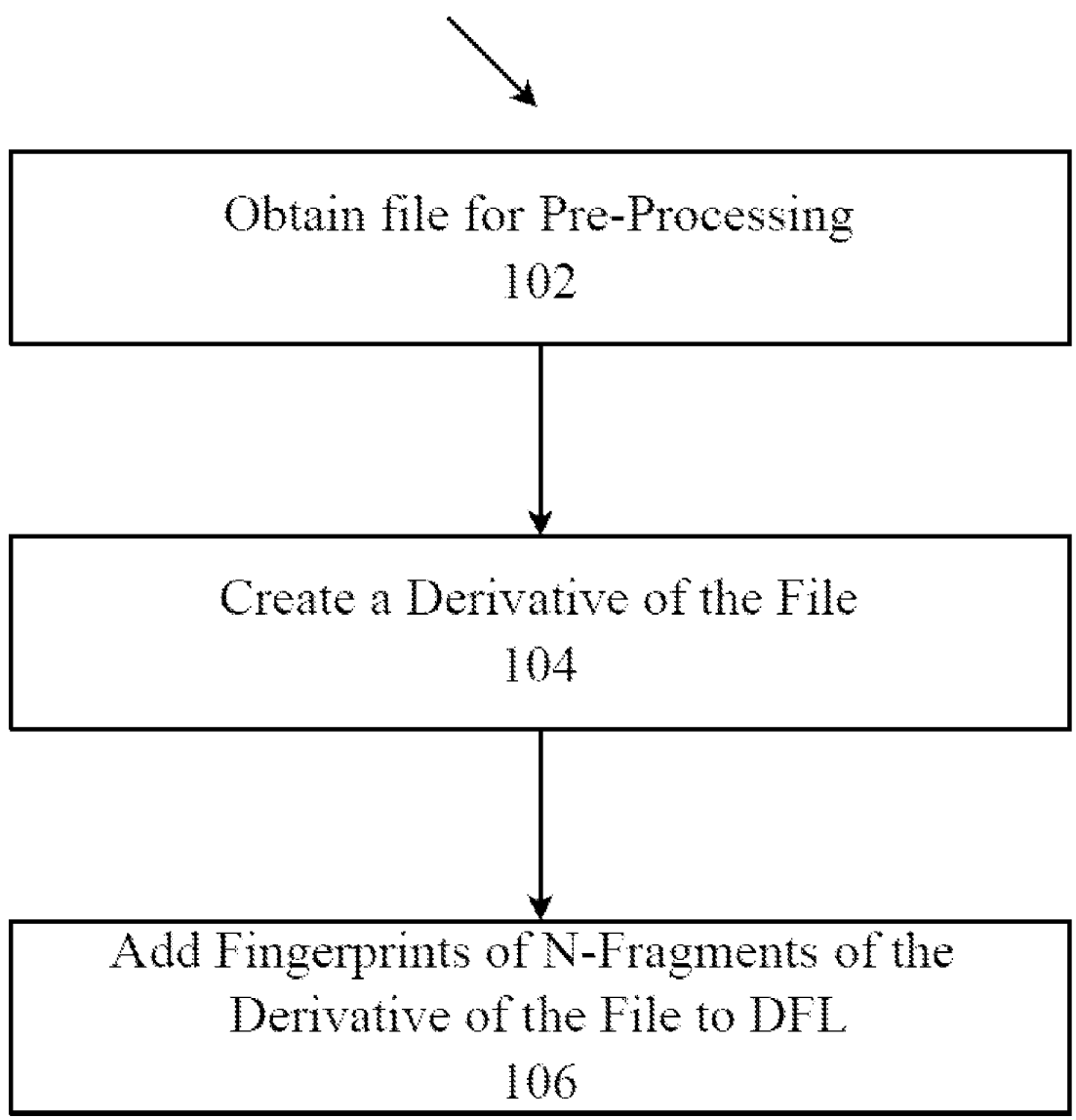
FIG. 1 is an overview of the generic method in accordance with an embodiment that outputs fingerprints of N-fragments of the derivative of the file to the DFL.

FIG. 1 is an overview of the pre-processing method with augmentation of the digital fingerprint library DFL.

As FIG. 1 illustrates, the method obtains a file that needs to be pre-processed at 102.

Then, the pre-processing step happens that creates a derivative of the file at 104.

Later, fingerprints of certain N-fragments from the derivate of the file are added to the digital fingerprint library at 106.

Figure 2:
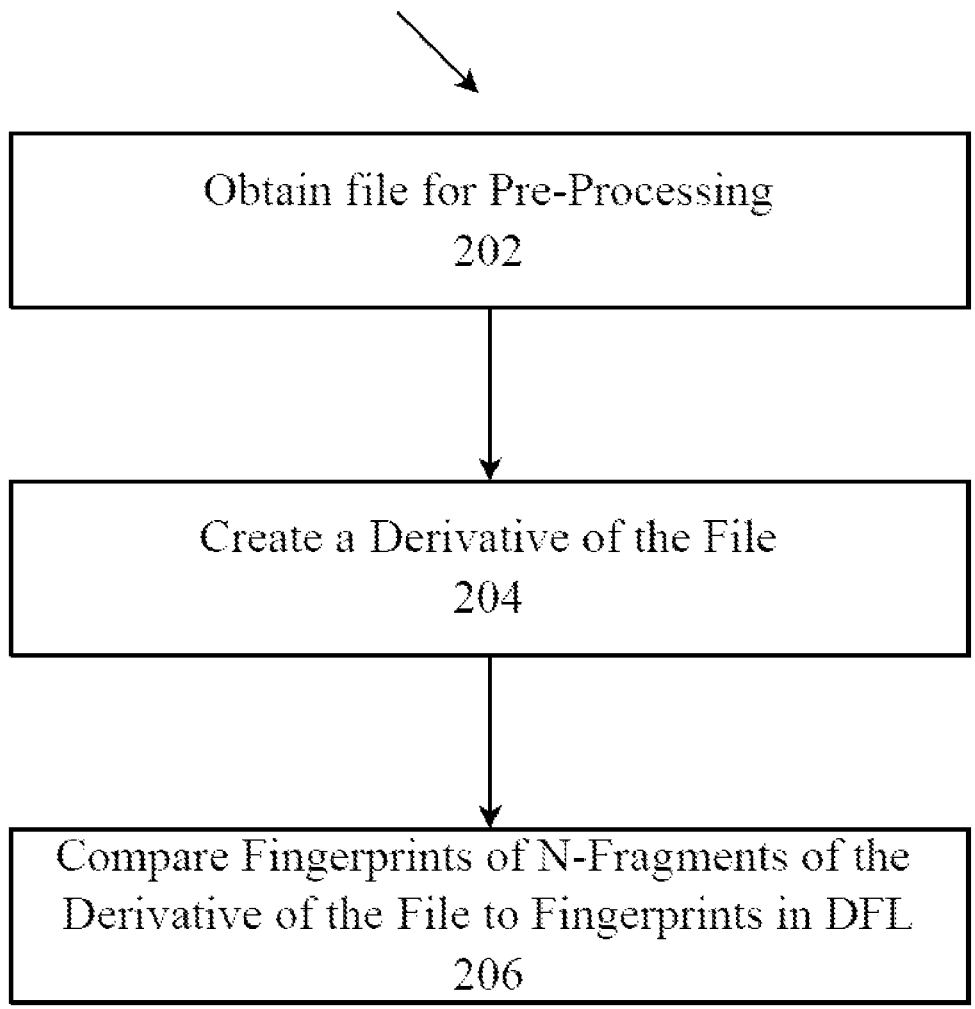
FIG. 2 is an overview of the generic method in accordance with an embodiment that uses fingerprints of N-fragments of the derivative of the file to compare to the fingerprints in the DFL.

FIG. 2 is an overview of the pre-processing method with fingerprint comparison of N-fragments from the derivative of the file to the fingerprints of N-fragments from other files stored in the digital fingerprint library DFL.

As FIG. 2 illustrates, the method obtains a file that needs to be pre-processed at 202.

Then, the pre-processing step happens that creates a derivative of the file at 204.

Later, fingerprints of certain N-fragments from the derivate of the file are compared against the fingerprints of N-fragments of other files stored in the digital fingerprint library at 206.

Figure 3:
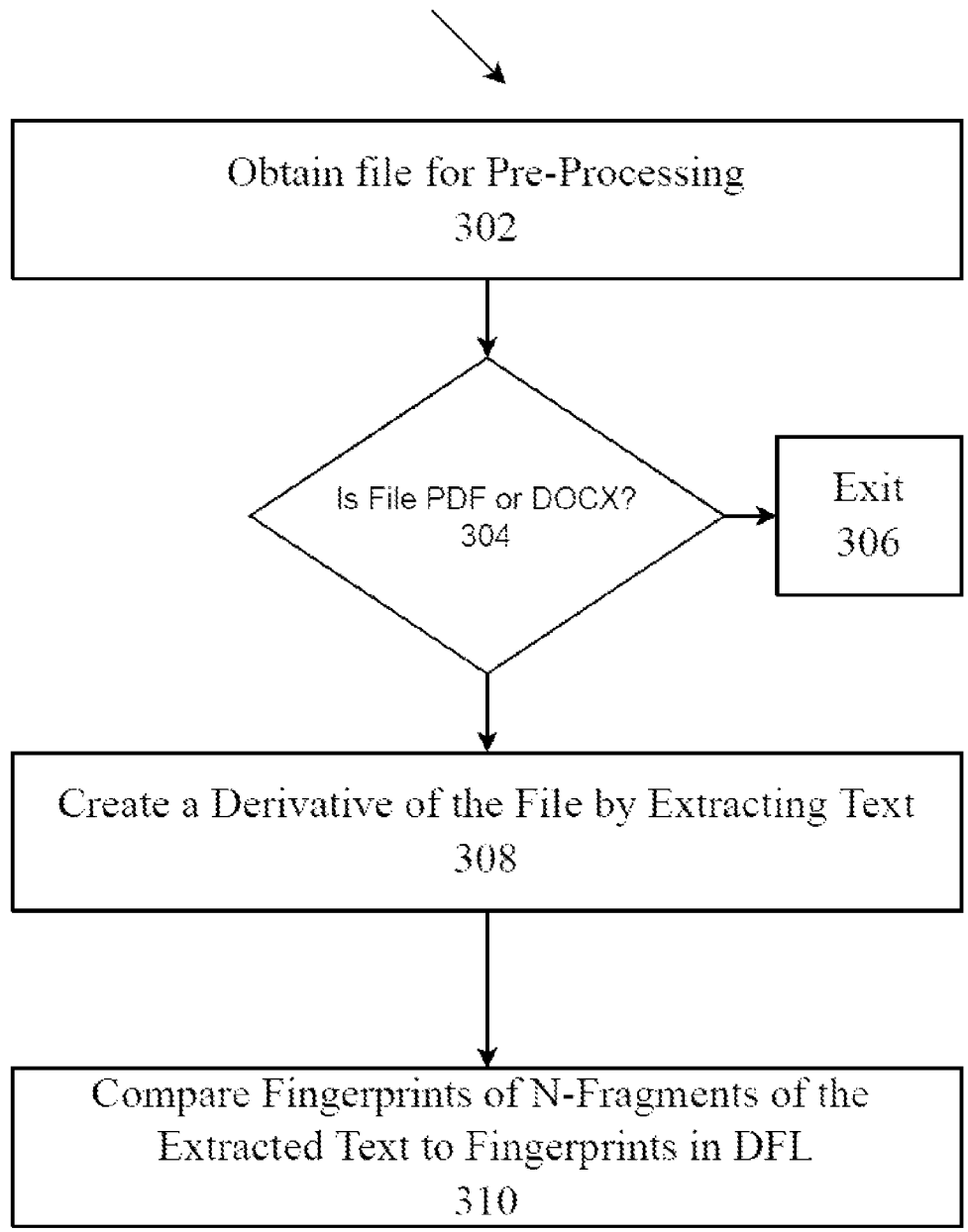
FIG. 3 is an implementation of the method in accordance with an embodiment that analyses the file type of files before processing with an example of processing a PDF and DOCX files.

FIG. 3 is an overview of the pre-processing method with conditional pre-processing and fingerprint comparison of N-fragments from the derivative of the file to the fingerprints of N-fragments from other files stored in the digital fingerprint library DFL.

As FIG. 3 illustrates, the method obtains a file that needs to be pre-processed at 302.

At 304, the file format of the files is detected and checked. If a file is a DOCX or a PDF document, the process proceeds to step 308 where a derivative of such is created by extracting text information from the file.

If the file is not a DOCX or a PDF document, the process ends.

If a derivative of the file was created at 308 by extracting text information from the file, fingerprints of certain N-fragments from the derivate of the file are compared against the fingerprints of N-fragments of other files stored in the digital fingerprint library at 310.

Figure 4:
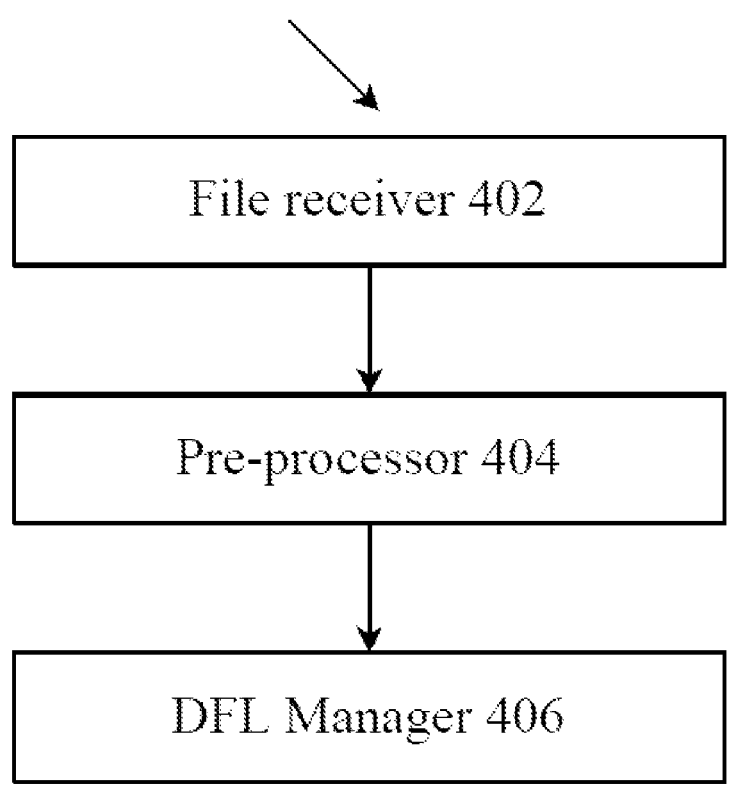
FIG. 4 is a block diagram of the version of the system that adds fingerprints of N-fragments of the derivative file to the digital fingerprint library.

FIG. 4 is a block diagram of system 400 for pre-processing a file with augmentation of a digital fingerprint library in accordance with one embodiment. The system 400 includes a processor, a file receiver 402, a preprocessor 404, and a DFL manager 406.

The file receiver 402 is configured to obtain a file that needs to be pre-processed.

The pre-processor 404 is configured to create a derivative of the file. For example, it extracts text from a DOCX or a PDF document.

The digital fingerprint library manager 406 is configured to add fingerprints of certain fragments of fixed size N from the created derivative of the file to the digital fingerprint library.

Figure 5:
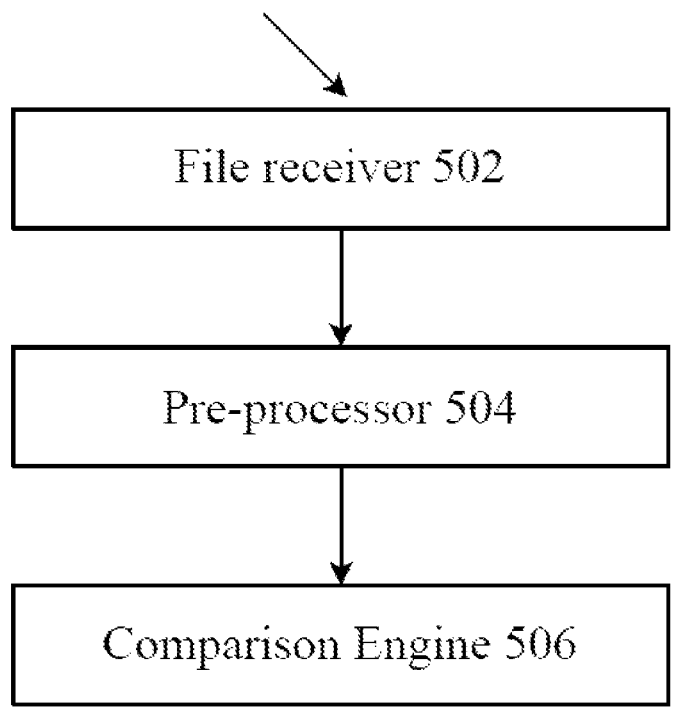
FIG. 5 is a block diagram of the version of the system that compares fingerprints of N-fragments of the derivative file to the digital fingerprint library.

FIG. 5 is a block diagram of system 500 for pre-processing a file with comparison of fingerprints of certain fragments of size N from the derivate of the file to the fingerprints of fragments of the same size from other files stored in the digital fingerprint library in accordance with one embodiment. The system 500 includes a file receiver 502, a preprocessor 504, and a comparison engine 506.

The file receiver 502 is configured to obtain a file that needs to be pre-processed.

The pre-processor 504 is configured to create a derivative of the file. For example, it extracts text from a DOCX or a PDF document.

The comparison engine 506 is configured to compare fingerprints of certain fragments of fixed size N from the created derivative to the fingerprints of fragments of the same size from other files stored in the digital fingerprint library.

In an embodiment, a digital fingerprint library also contains fingerprints of N-fragments generated from sources other than a file, e.g., a database, a communication, another transactional record, or a stream.

In an embodiment, the method step of pre-processing includes at least one of extracting text from a file containing text, converting the text to a pre-defined codepage, implementing Unicode normalization forms, replacing symbols with modifiers to Latin symbols without modifiers, decomposing diacritics and digraphs, and removing combining marks from text, removing double spaces from the text, removing spaces from text, removing punctuation marks from the text, removing certain characters from the text, removing words, indicating "noise" expressions, from the text, removing footers, headers, and standard fragments including salutations and signatures from the text, replacing non-Latin characters according to predefined rules, and decompiling binary files to obtain source code in text format.

In an embodiment, the method step of pre-processing of a file includes at least one of translating the text of the file to a predefined language using an automatic translation tool, translating the text of the file to the pre-defined language using a manual translation method, implementing an automatic text enhancement tool to enhance the text of the file for spell check, thesaurus, grammar check, sentence correction, and the language optimization.

In an embodiment, the method step of pre-processing of a file includes at least one of: translating the text of the file to a pre-defined language using an automatic translation tool, translating the text of the file to the pre-defined language using a manual translation method, identifying the language of the text, using Artificial Intelligence, for translating the text from the determined language to the pre-defined language using an automatic translation tool, de-compiling a source code of the file, using a decompiler corresponding to the compiler used to compile the file, re-compiling the file with the compiler specific to the digital fingerprint library.

The invention claimed is:

1. A method of pre-processing a file by creating that file's derivative that contains data or the purpose of comparing its fragments of fixed size N to other fragments of size N in other files, method comprising the steps of:
    obtaining the file for pre-processing;
    creating a derivative of the file that is different from the file by
        de-compiling a source code of the file, using a decompiler corresponding to the compiler used to compile the file,
        re-compiling the file with the compiler specific to a digital fingerprint library,
        identifying a language of the text of the file, using Artificial Intelligence, for translating the text of the file from the identified language to a pre-defined language using an automatic translation tool,
        translating at least a portion of the text of the file to the pre-defined language using the automatic translation tool,
        translating at least a portion of the text of the file to the pre-defined language using a manual translation method,
        implementing an automatic text enhancement tool to enhance the text of the file for spell check, thesaurus, grammar check, sentence correction, and language optimization;
    creating a collection of strings of size greater than fixed size N from the derivative of the file;
    storing the collection of strings of size greater than fixed size N;
    adding fingerprints of fragments of fixed size N from the derivative of the file to the digital fingerprint library;
    comparing fingerprints of certain fragments of fixed size N from the derivative of the file to the digital fingerprint library;
    calculating, for each of the strings in the collection of strings, the number of fragments of fixed size N from the derivative of the file that are substrings of the string and have a matching fingerprint in the digital fingerprint library; and
    when the number of fragments of fixed size N that are substrings of the string have matches in the digital fingerprint library, determining the string has a common source with the matches in the digital fingerprint library.

2. The method of claim 1, wherein the step of obtaining file for pre-processing further
    comprises the step of determining parameters for classification associated with the file, such as file format; and the step of creating a derivative is based on the determination of these parameters.

3. The method of claim 1, wherein the step of creating a derivative file further comprises
    the steps of:
        a. extracting text from a file containing text;
        b. converting the text to a pre-defined codepage;
        c. implementing Unicode normalization forms;
        d. replacing symbols with modifiers to Latin symbols without modifiers;
        e. decomposing diacritics and digraphs, and removing combining marks from text;
        f. removing double spaces from the text;
        g. removing spaces from text;
        h. removing punctuation marks from the text;
        i. removing certain characters from the text, e.g., vowels;
        j. removing words, indicating "noise" expressions, from the text;
        k. removing footers, headers, and standard segments including salutations and signatures from the text;
        l. replacing non-Latin characters according to predefined rules; or
        m. decompiling binary files to obtain source code in text format.

4. A system implemented to pre-process a file by creating its derivative for the purpose of comparison of the fingerprints of its fragments of length N to fragments of length N from other files, wherein the system comprises:
    a digital fingerprint library including a memory for storing fingerprints of fragments;
    a processor;
    a file receiver configured to obtain a file for pre-processing;
    a pre-processor for pre-processing the file, wherein the pre-processor is configured to create a derivative of the file by;
        de-compiling a source code of the file, using a decompiler corresponding to the compiler used to compile the file, and
        re-compiling the file with the compiler specific to the digital fingerprint library,
        identifying a language of the text of the file, using Artificial Intelligence, for translating the text of the file from the identified language to a pre-defined language using an automatic translation tool, translating at least a portion of the text of the file to a pre-defined language using the automatic translation tool, translating at least a portion of the text of the file to the pre-defined language using a manual translation method, and implementing an automatic text enhancement tool to enhance the text of the file for spell check, thesaurus, grammar check, sentence correction, and language optimization;

a digital fingerprint library manager configured to add fingerprints of certain fragments of size N of the derivative of the file to the digital fingerprint library by creating a collection of strings of size greater than fixed size N from the derivative of the file, and storing the collection of strings of size greater than fixed size N;

a comparison engine that compares fingerprints of certain fragments of size N of the derivative of the file to the digital fingerprint library including:

calculating, for each of the strings in the collection of strings, the number of fragments of fixed size N from the derivative of the file that are substrings of the string and have a matching fingerprint in the digital fingerprint library; and when the number of fragments of fixed size N that are substrings of the string have matches in the digital fingerprint library, determining the string has a common source with the matches in the digital fingerprint library.

5. The system of claim 4, wherein the file receiver is further configured to determine parameters for classification associated with the file and the pre-processor for preprocessing the file is configured to perform pre-processing based on the determination of these parameters.

6. The system of claim 4, wherein the pre-processor configured to perform the symmetric processing is further configured to:

a. extract text from a file containing protected information;

b. convert the text to a pre-defined codepage;

c. implement Unicode normalization forms;

d. replace symbols with modifiers to Latin symbols without modifiers;

e. decompose diacritics and digraphs, and removing combining marks from the text;

f. remove spaces from the text;

g. remove punctuation marks from the text;

h. remove certain characters from the text;

i. remove words, indicating noise expressions, from the text;

j. remove footers, headers, and standard segments including salutations and signatures from the text;

k. replace non-Latin characters according to predefined rules; and l. decompile binary files to obtain source code in text format.

* * * * *